US007298391B2

(12) United States Patent

Emmert et al.

(10) Patent No.: US 7,298,391 B2

(45) Date of Patent: Nov. 20, 2007

(54) LASER PRINTER FOR BRAILLE

(75) Inventors: James R. Emmert, Corvallis, OR (US); Charles Evans, Corvallis, OR (US); Michael A. Rencher, Corvallis, OR (US); Douglas G. Keithley, Boise, ID (US)

(73) Assignee: Marvell International Technology Ltd. (BM)

( * ) Notice: Subject to any disclaimer, the term of this patent is extended or adjusted under 35 U.S.C. 154(b) by 282 days.

(21) Appl. No.: 10/940,863

(22) Filed: Sep. 13, 2004

(65) Prior Publication Data

US 2006/0055768 A1 Mar. 16, 2006

(51) Int. Cl.

| | |
|---|---|
| ***B41J 2/47*** | (2006.01) |
| ***B41J 2/435*** | (2006.01) |
| ***G01D 15/14*** | (2006.01) |

(52) U.S. Cl. ...................................... 347/251; 347/224

(58) Field of Classification Search ................ 347/251, 347/224

See application file for complete search history.

(56) References Cited

U.S. PATENT DOCUMENTS

| | | | | |
|---|---|---|---|---|
| 5,240,335 | A * | 8/1993 | Itoh et al. | 400/109.1 |
| 5,835,123 | A * | 11/1998 | Chung et al. | 347/251 |
| 5,839,016 | A * | 11/1998 | Folkins et al. | 399/46 |
| 5,974,280 | A * | 10/1999 | Takesue et al. | 399/62 |
| 6,184,971 | B1 * | 2/2001 | Narita et al. | 355/67 |
| 6,930,786 | B2 * | 8/2005 | Kataoka et al. | 358/1.12 |
| 2004/0165897 | A1 * | 8/2004 | Hooper et al. | 399/44 |
| 2004/0243111 | A1 * | 12/2004 | Bendett et al. | 606/5 |

FOREIGN PATENT DOCUMENTS

| | | | |
|---|---|---|---|
| JP | 58063973 | A * | 4/1983 |
| JP | 02220882 | A * | 9/1990 |
| JP | 04333858 | A * | 11/1992 |
| JP | 08063039 | A * | 3/1996 |
| JP | 10058819 | A * | 3/1998 |

OTHER PUBLICATIONS

Tom Harris."How Laser Printers Work". Mar. 14, 2001□□http://computer.howstuffworks.com/laser-printer.htm.*

* cited by examiner

*Primary Examiner*—Hai Pham
*Assistant Examiner*—Kainoa Wright

(57) ABSTRACT

A laser printer for Braille that obviates the need for embossing mechanisms and specialized paper. A laser printer for Braille according to the present teachings increases an amount of a toner that adheres to an area of a paper that corresponds to the Braille element. The increased amount of toner yields a printed Braille element that may be read by touch.

25 Claims, 3 Drawing Sheets

LASER PRINTER FOR BRAILLE

BACKGROUND

Braille is a writing system for visually impaired or sightless people, consisting of raised elements, e.g. bumps, that are read by touch. A Braille document may include a pattern of Braille elements that are embossed in a relatively thick paper.

A Braille printer may be used to generate Braille documents using a computer system. A Braille printer may include a mechanism for embossing Braille elements into a relatively thick paper. For example, a Braille printer may include a mechanism for punching a pattern of bumps into a thick paper. The relative thickness of the paper is intended to hold the shape of the bumps in the paper.

Unfortunately, prior Braille printers may be relatively expensive and cumbersome to use. For example, an embossing mechanism for punching Braille elements into paper may be relatively expensive to manufacture particularly in light of the relatively low volume of Braille printers that may be produced. In addition, the relatively thick paper used in prior Braille printers may be expensive and difficult to obtain in comparison to paper that is used in sight read text/graphics printers.

SUMMARY OF THE INVENTION

A laser printer for Braille is disclosed that obviates the need for embossing mechanisms and specialized paper. A laser printer that prints a Braille element according to the present teachings increases an amount of a toner that adheres to an area of the paper that corresponds to the Braille element. The increased amount of toner yields a printed Braille element that may be read by touch.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
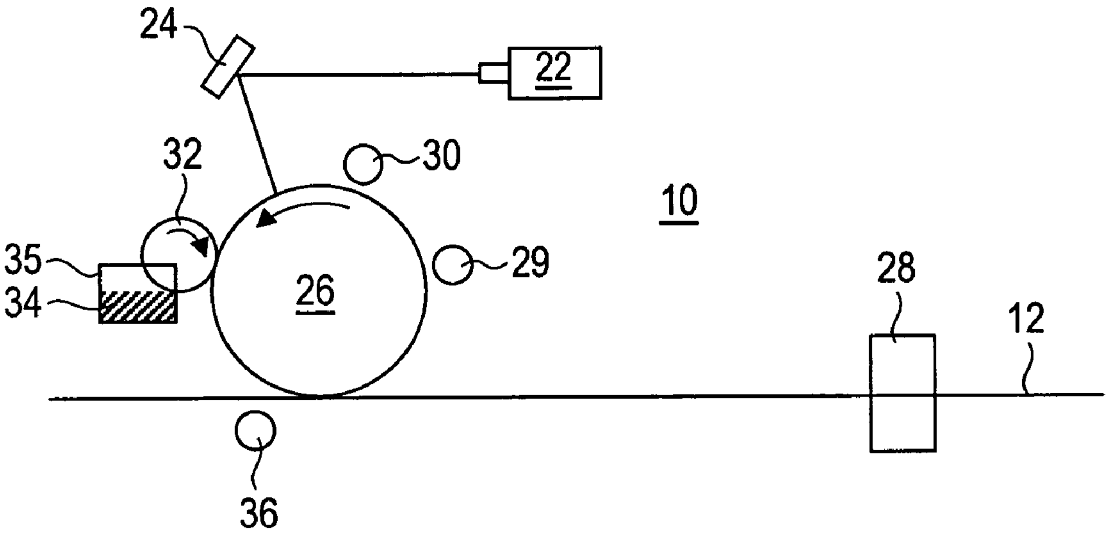
FIG. 1 shows a laser printer for printing Braille onto a paper according to the present techniques.

FIG. 1 shows a laser printer 10 for printing Braille onto a paper 12 according to the present techniques. The paper 12 may be the same type of paper that may be used for printing text or graphics suitable for sight reading.

The laser printer 10 includes a drum 26 that rotates, e.g. in a counter-clockwise direction as shown. The drum 26 includes a photoconductive material that may be discharged by light. As the drum 26 rotates, a drum charger 30 imparts a positive electrical charge onto the drum 26. The drum charger 30 may be an electrical wire with electrical current passing through or may be a charged roller.

The laser printer 10 writes a Braille element onto the drum 26 by performing an enhanced discharge of an area of the drum 26 that corresponds to the Braille element. The amount of the enhanced discharge may be selected to increase an amount of a toner 34 from a toner holder 35 that adheres to the area of the drum 26 that corresponds to the Braille element. For example, the enhanced discharge may be selected to yield a tactile feel, e.g. a bump feel, to the Braille element after the toner that adheres to the Braille element is transferred to and fused onto the paper 12.

In one embodiment, the enhanced discharge of the area of the drum 26 corresponding to the Braille element is provided by applying an enhanced amount of light from a laser 22 onto the area of the drum 26. For example, a set of additional pulses of light may be applied from the laser 22 to the area of the drum 26 corresponding to the Braille element.

The laser printer 10 includes a scanning mirror 24 that applies light pulses from the laser 22 onto the drum 26. The combination of motions of the scanning mirror 24, the rotation of the drum 26, and the light pulses from the laser 22 are used to draw Braille elements onto the drum 26.

The laser printer 10 includes a roller 32 that rolls the toner 34 onto the surface of the drum 26 as it rotates. The toner 34 is positively charged and adheres to the negatively charged areas of the drum 26. The enhanced discharge of the area of the drum 26 corresponding to the Braille element increases an amount of the toner 34 that adheres to the Braille element on the drum 26 in comparison to an amount of the toner 34 that adheres to areas not having an enhanced discharge, e.g. areas for printing text and graphics for sight reading.

The laser printer 10 includes a paper charger 36 that applies a negative charge to the paper 12 as it approaches the drum 26. The paper charger 36 may be an electrical wire with electrical current passing through.

The negative charge on the paper 12 attracts the toner that has adhered to the drum 26, thereby transferring the Braille element from the drum 26 onto the paper 12. The paper 12 then passes through a fuser 28 that melts the deposited toner onto the paper 12. The enhanced amount of toner transferred from the Braille element on the drum 26 to the paper 12 yields a tactile feel on the paper 12 after fusing.

The laser printer 10 includes a drum discharger 29, e.g. a bright lamp, that discharges the drum 26 to erase the Braille element from the drum 26.

In other embodiments, the above-described charge polarities may be reversed. For example, the drum 26 may initially be charged to a negative charge and then written by positively charging the Braille element areas of the drum 26.

Figure 2:
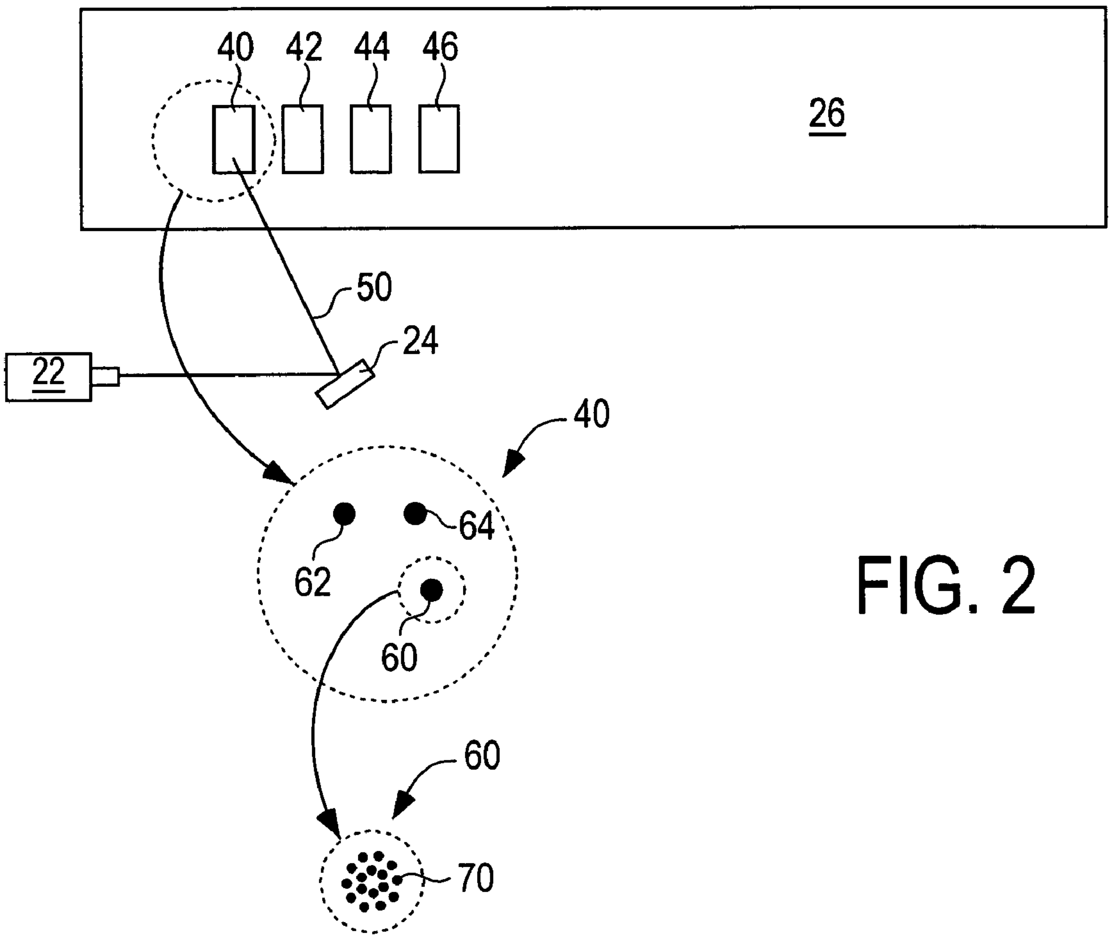
FIG. 2 shows progressive close-up views of an example set of Braille characters written onto a drum of a laser printer according to the present techniques.

FIG. 2 shows progressive close-up views of an example set of Braille characters 40-46 written onto the drum 26. The Braille characters 40-46 are written using combination of motions of the scanning mirror 24, the rotation of the drum 26, and a series light pulses from the laser 22.

A close-up view of the Braille character 40 shows that it includes an arrangement of Braille elements 60-64. The Braille elements 60-64 each define an area that will be perceivable to touch, i.e. a bump, when printed on the paper 12. The laser 22 writes the Braille elements 60-64 by applying a series of light pulses 50 that discharge the areas of the drum 26 that correspond to the Braille elements 60-64 on the drum 26.

A close-up view of the Braille element 60 shows that the series of light pulses 50 discharge an arrangement of dots 70. Each dot 70 corresponds to the resolution of the laser 22 and the scanning mirror 24, i.e. the maximum resolution of the laser printer 10.

The pattern used to make up the Braille element 60 may have a significant impact on the amount of toner transferred. Depending on the embodiment, the pattern may be a solid fill of toner, or a specific pattern of dots designed to maximize the toner pile height. For example, on jump gap systems in which the roller 32 is not in contact with the drum 26, a solid filled area has higher amounts of toner at the edges than in the center. A series of rings or separate larger dots that are larger than the native resolution of the laser printer 10 may yield a significant increases in toner over a solid filled area.

The laser printer 10 when printing a Braille element uses the laser 22 to provide a greater discharge of the drum 26 so that the discharge pattern on the drum 26 attracts more of the toner 34 from the roller 32. In one embodiment, the laser printer 10 when printing a text or graphics image for sight reading applies one pulse of the laser 22 per dot of resolution. For a Braille element, the laser printer 10 applies two or more pulses of the laser 22 to each of the dots 70. Each pulse of the laser 22 on each dot 70 produces a greater negative charge on the drum 26.

Figure 3:
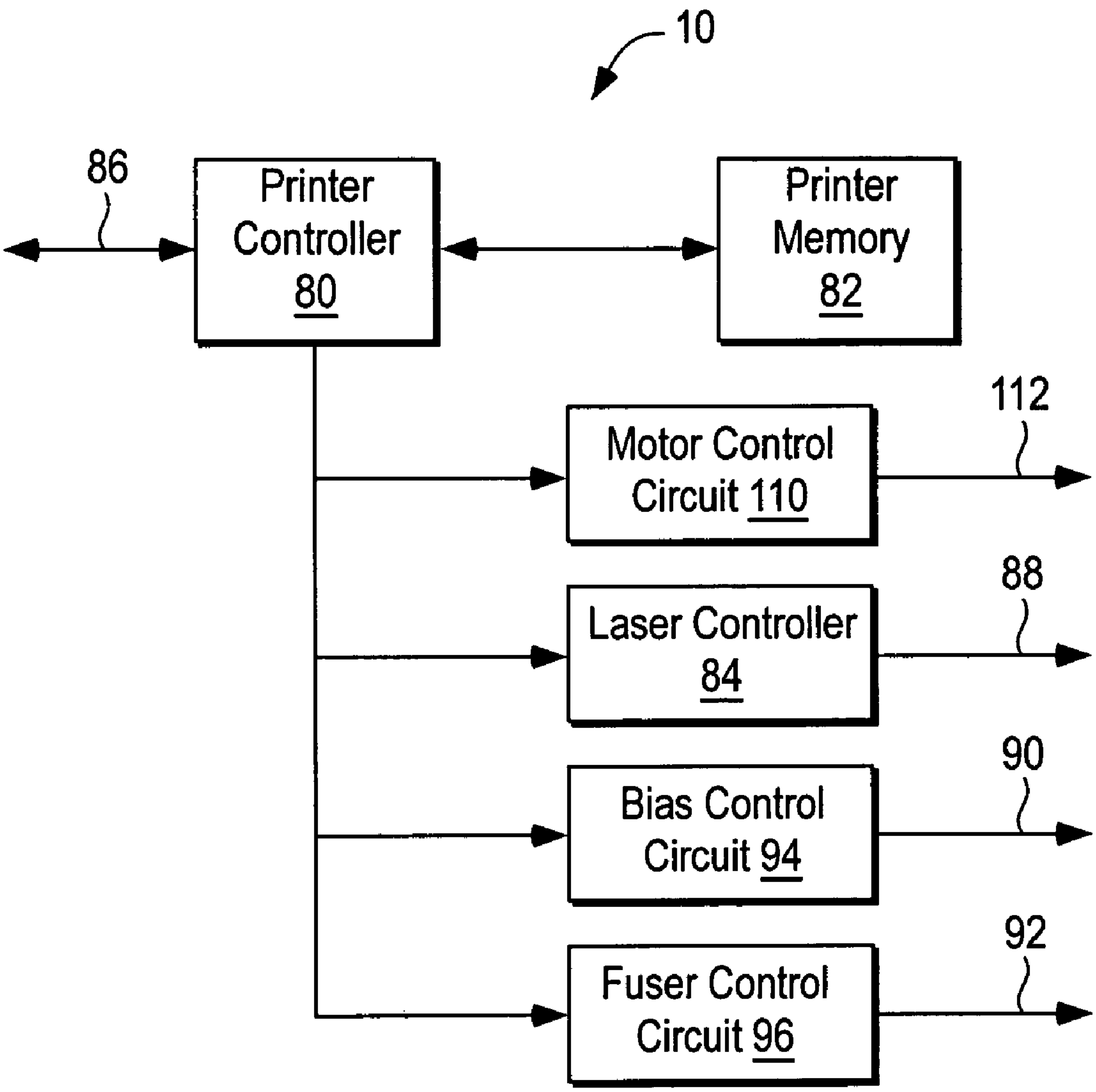
FIG. 3 shows a set of control circuits in a laser printer that are employed in printing Braille.

FIG. 3 shows a set of control circuits in the laser printer 10 that are employed in printing Braille. The laser printer 10 includes a printer controller 80 that receives print files from a computer system via a communication path 86. Examples of the communication path 86 includes a USB port, parallel port, serial port, Ethernet, etc.

The laser printer 10 includes a printer memory 82 that holds a bit map of the dots to be printed onto the paper 12 when printing Braille. In some embodiments, the bit map is generated on a computer system and transferred to the laser printer 10 via the communication path 86. In other embodiments, the printer controller 80 generates the bit map in response to information contained in a print file obtained via the communication path 86.

The laser printer 10 includes a laser controller 84. The printer controller 80 issues commands to the laser controller 84. The commands cause the laser controller 84 to issue control signals 88 to the laser 22 and the scanning mirror 24 to hit the drum 26 with pulses of light. When printing Braille, the printer controller 80 causes the laser controller 84 to generate additional pulses of light for each dot of a Braille element.

The laser printer 10 includes a bias control circuit 94 that generates a set of control signals 90 for controlling biases applied to the toner holder 35 that contains the toner 34 and for controlling an amount of charge applied to the drum 26 by the drum charger 30. The bias control circuit 94 enables the printer controller 80 to print Braille elements by controlling the charge on the drum 26 together with a bias applied to the toner holder 35 so that more of the toner 34 is attracted to the drum 26 when printing Braille elements. In one embodiment of the laser printer 10, the bias that is used to adjust the amount of the toner 34 placed on an area of the paper 12 is a DC bias for primary charging of the drum 26 and developing using the toner holder 35 of approximately 700VDC. For wider ranges of density, i.e. more toner deposition, both the DC and AC biases may be adjusted. The biases used on the toner 34 and the drum charger 30 may be independently controlled or may be controlled in concert. An interaction of the biases used on the toner 34 and the drum charger 30 may significantly influence how much toner is applied to the paper 12.

The printer controller 80 uses the bias control circuit 94 to control the charge on the drum 26 together with a bias applied to the toner holder 35 on a page by page basis. The control of charge on the drum 26 with the bias to the toner holder 35 provides a density setting. The density is a measure of how much of the toner 34 is applied to the paper 12. The density may be used to provide a "Braille page" setting for the laser printer 10 such that the amount of the toner 34 applied to the drum 26 (and ultimately the paper 12) is maximized. The Braille page setting may be used in combination with extra light pulses from the laser 22 when printing Braille elements.

The particles of the toner 34 may be enlarged to facilitate the formation of tactile bumps for Braille elements. If toner particle size is changed, the DC and AC biases may be adjusted to compensate for the changed particle size.

The laser printer 10 includes a fuser control circuit 96 that generates a set of control signals 92 to the fuser 28. The fuser control circuit 96 enables the printer controller 80 to control an amount of pressure applied by a set of rollers in the fuser 28 to the paper 12. For example, the printer controller 80 may reduce the amount of pressure applied by the rollers when printing a Braille page. The reduced pressure increases the height of Braille bumps. In addition, the fuser control circuit 96 enables the printer controller 80 to control the temperature applied by the fuser 28. For example, the temperature of the fuser 28 may be reduced when printing a Braille page so that the height of Braille bumps is increased.

The printer controller 80 may reduce the speed of movement of the paper 12 when printing a Braille page. For example, the laser printer 10 in one embodiment includes a motor control circuit 110 that generates a set of control signal 112 that provide paper speeds of one-half, one-third, and one quarter normal speed. The different speeds may be employed for different types of media that require significantly more heating. A slower print speed enables the paper 12 to spend more time in the fuser 28 to increase heat to the toner without generating more heat in the fuser 28. The increased time in the fuser 28 increases the heat applied to the paper 12 and facilitates the heating of larger amounts of toner on Braille elements.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for printing a Braille element comprising:

rotating a drum through at least a first complete revolution;

charging the drum during a first part of the first revolution;

generating a first control signal from a controller operating in a Braille printing mode;

successively applying more than one pulse of light, one on top of the other, to a predetermined spot on the drum in response to the first control signal during a second part of the first revolution;

adhering a toner to the predetermined spot during a third part of the first revolution;

transferring the toner adhered to the predetermined spot to a first paper during a fourth part of the first revolution;

forming at least a portion of the Braille element on the first paper with the toner transferred from the predetermined spot;

discharging the drum at a fifth part of the first revolution;

fusing the Braille element to the first paper;

switching the controller from the Braille printing mode to a sight-read printing mode;

generating a second control signal from the controller operating in the sight-read printing mode;

forming a sight-read element on a second paper during a second revolution of the drum in response to the second control signal; and fusing the sight-read element to the second paper.

2. The method of claim 1 wherein successively applying more than one pulse of light to the predetermined spot on the drum comprises successively applying more than one pulse of light to each of a plurality of predetermined spots during the second part of the first revolution, and further comprising adhering the toner to each of the plurality of predetermined spots during the third part of the first revolution, transferring the toner adhered to the plurality of predetermined spots to the paper during the fourth part of the first revolution, and forming an entirety of the Braille element on the paper with the toner adhered to the plurality of predetermined spots.

3. The method of claim 1 wherein charging the drum during the first part of the first revolution comprises applying a first charge to the drum, and further comprising charging the drum to a second charge during a first part of the second revolution, wherein the first charge is greater than the second charge.

4. The method of claim 1 further comprising applying a first bias to the toner during the first revolution of the drum, and applying a second bias to the toner during the second revolution, wherein the first bias is greater than the second bias.

5. The method of claim 1 wherein fusing the Braille element to the first paper comprises applying a first pressure to the Braille element, and wherein fusing the sight-read element to the second paper comprises applying a second pressure to the sight-read element, wherein the first pressure is less than the second pressure.

6. The method of claim 1 wherein fusing the Braille element to the first paper comprises moving the first paper through a fuser at a first speed, and wherein fusing the sight-read element to the second paper comprises moving the second paper through the fuser at a second speed, wherein the first speed is less than the second speed.

7. The method of claim 1 wherein fusing the Braille element to the first paper comprises applying a first temperature to the first paper, and wherein fusing the sight-read element to the second paper comprises applying a second temperature to the second paper, wherein the first temperature is less than the second temperature.

8. The method of claim 1 further comprising applying only one pulse of light to any one spot on the drum during the second revolution.

9. A method for printing a Braille element comprising:

rotating a drum through at least a first complete revolution;

charging the drum during a first part of the first revolution;

discharging a first predetermined area on the drum during a second part of the first revolution;

adhering a toner to the first predetermined area during a third part of the first revolution;

transferring the toner adhered to the first predetermined area to a first paper during a fourth part of the first revolution;

forming the entire Braille element on the first paper with the toner transferred from the first predetermined area;

generating a first control signal from a controller operating in a Braille printing mode;

applying a first temperature to the first paper with a fuser while moving the paper through the fuser at a first speed in response to the first control signal;

discharging the drum at a fifth part of the first revolution;

switching the controller from the Braille printing mode to a sight-read printing mode;

rotating the drum through at least a second complete revolution;

charging the drum during a first part of the second revolution;

discharging a second predetermined area on the drum during a second part of the second revolution;

adhering a toner to the second predetermined area during a third part of the second revolution;

transferring the toner adhered to the second predetermined area to a second paper during a fourth part of the second revolution;

forming at least a portion of a sight-read element on the second paper with the toner transferred from the second predetermined area;

generating a second control signal from the controller operating in the sight-read printing mode;

applying a second temperature to the second paper with the fuser while moving the second paper through the fuser at a second speed in response to the second control signal, wherein one or both of the second temperature and speed are greater respectively than the first temperature and speed; and discharging the drum at a fifth part of the second revolution.

10. The method of claim 9 wherein the second temperature is greater than the first temperature.

11. The method of claim 10 wherein the second speed is greater than the first speed.

12. A laser printer for printing a Braille element on a paper comprising:

a rotatable drum;

a toner applicator adapted to apply toner to the drum;

a controller adapted to generate control signals corresponding to a Braille printing mode and a sight-read printing mode; and a fuser adapted to affix the toner to the paper, wherein the fuser comprises a pressure applicator adjustably moveable between at least first and second pressure configurations in response to the control signals received from the controller operating in the sight-read printing mode and the Braille printing mode respectively wherein the toner is adapted to be affixed to a first paper at a first height so as to form the Braille element on the first paper when the pressure applicator is moved to the second pressure configuration, and wherein the toner is adapted to be affixed to a second paper at a second height so as to form a sight-read element on the second paper when the pressure applicator is moved to the first pressure configuration, wherein the first pressure configuration is greater than the second pressure configuration.

13. The laser printer of claim 12 wherein said controller comprises a fuser control circuit in communication with the fuser, wherein the pressure applicator of the fuser is moveable between the at least first and second pressure configurations in response to a signal received from the fuser control circuit.

14. A laser printer for printing a Braille element on a paper comprising:

a rotatable drum;

a toner applicator adapted to apply toner to the drum;

a controller adapted to generate control signals corresponding to a Braille printing mode and a sight-read printing mode;

a fuser adapted to affix the toner to the paper, wherein the fuser is adjustably operable between at least first and second temperatures in response to the control signals received from the controller operating in the Braille printing mode and the sight-read printing mode respectively, wherein the toner is adapted to be affixed to a first paper at a first height so as to form the Braille element on the first paper when the fuser is operated at the first temperature, and wherein the toner is adapted to be affixed to a second paper at a second height so as to form a sight-read element on the second paper when the fuser is operated at the second temperature; and a paper feed adapted to control the speed of the first and second papers moving through the fuser in response to the control signals received from the controller operating in the Braille printing mode and the sight-read printing mode respectively, wherein the paper feed is adjustably settable between at least a first paper speed and a second paper speed, wherein the toner is adapted to be affixed to the paper at the first height so as to form the Braille element on the paper when the paper feed is set at the first paper speed and wherein the toner is adapted to be affixed to the paper at the second height so as to form the sight-read element on the second paper when the paper feed is set at the second paper speed;

wherein one or both of the second temperature and speed is greater respectively than the first temperature and speed.

15. A laser printer for printing a Braille element, on a paper, the laser printer comprising:

forming means for adjustably applying toner directly to a drum during a first single revolution of the drum, wherein the toner applied directly to the drum during the first single revolution corresponds to an entirety of the Braille element and for adjustably applying toner directly to the drum during a second single revolution of the drum, wherein the toner applied directly to the drum during the second single revolution corresponds to an entirety of a sight-read element;

application means for applying the toner from the drum to a first paper and thereby forming the Braille element on the first paper and for applying the toner from the drum to a second paper and thereby forming the sight-read element on the second paper; and controller means for controlling the forming means and application means in a Braille printing mode and a sight-read printing mode.

16. The laser printer of claim 15, wherein the forming means comprises drum adhesion means for determining an amount of the toner that adheres to the drum.

17. The laser printer of claim 16, wherein the drum adhesion means comprises discharge means for discharging an area of the drum.

18. The laser printer of claim 17, wherein the controller means comprises a laser controller for controlling an amount of light applied from a laser in the laser printer onto the area of the drum.

19. The laser printer of claim 18, wherein the laser controller operably controls the laser to apply more than one pulse of light to the area of the drum when operating in the Braille printing mode.

20. The laser printer of claim 17, wherein the controller means comprises a bias control circuit for controlling a bias to a toner holder that contains the toner.

21. The laser printer of claim 17, wherein the controller means comprises a bias control circuit for controlling a charge on the drum.

22. The laser printer of claim 15, wherein the controller means comprises a bias control circuit for controlling a bias to a toner holder that contains the toner and a charge on a drum in the laser printer.

23. The laser printer of claim 15, wherein the controller means comprises means for controlling a pressure applied to the paper by a fuser.

24. The laser printer of claim 15, wherein the controller means comprises means for adjusting a speed of movement of the paper through the laser printer.

25. The laser printer of claim 15, wherein the controller means comprises means for controlling a temperature applied to the paper by a fuser.

* * * * *